United States Patent
Kudoh

[11] Patent Number: 6,075,479
[45] Date of Patent: Jun. 13, 2000

[54] RADAR APPARATUS INSTALLED ON VEHICLE FOR PRODUCING CORRECT DETECTING RESULT

[75] Inventor: Hiroshi Kudoh, Saitama, Japan

[73] Assignee: Honda Giken Kogyo Kabushiki Kaisha, Tokyo, Japan

[21] Appl. No.: 09/250,376

[22] Filed: Feb. 16, 1999

[30] Foreign Application Priority Data

Feb. 16, 1998 [JP] Japan .................................. 10-050142

[51] Int. Cl.[7] .................................................. G01S 13/93
[52] U.S. Cl. ............................ 342/70; 342/27; 342/89; 342/159; 342/175; 342/195
[58] Field of Search .................. 342/23, 27, 28, 342/29, 33, 36, 41, 70–72, 89–97, 118, 159–164, 175, 195

[56] References Cited

U.S. PATENT DOCUMENTS

| | | |
|---|---|---|
| 5,321,407 | 6/1994 | Kikuchi et al. . |
| 5,448,244 | 9/1995 | Komatsu et al. . |
| 5,923,280 | 7/1999 | Farmer ...................................... 342/70 |

FOREIGN PATENT DOCUMENTS

| | | |
|---|---|---|
| 5180934 | 7/1993 | Japan . |
| 2567332 | 10/1996 | Japan . |

*Primary Examiner*—Bernarr E. Gregory
*Attorney, Agent, or Firm*—Carrier, Blackman & Associates, P.C.; Joseph P. Carrier; William D. Blackman

[57] ABSTRACT

A radar apparatus installed on a vehicle includes a transmission section and a reception section. The transmission section has at least a transmission antenna, and emits a transmission wave toward a detection area in a front of the vehicle. The transmission wave may be reflected by a reflector such as a preceding vehicle to produce reflection wave, and the detection area includes a plurality of sub-areas. The reception section has at least a reception antenna, and receives and detects the reflection wave. A detecting unit detects a reflector indication data indicative of a reflector attribute for every sub-area for a current detection cycle based on the detecting result by the reception section. Also, the detecting unit determines whether the detected reflector indication data are correct, by use of the detected reflector indication data, to determine that the detected reflector indication data are final reflector indication data when it is determined that the detected reflector indication data is correct. A correcting unit corrects an incorrect part of the detected reflector indication data to a correct reflection indication data to produce the final reflector indication data, when it is determined that the part of the detected reflector indication data is not correct. A determining unit determines whether there is the reflector in the detection area, based on the final reflector indication data.

18 Claims, 5 Drawing Sheets

RADAR APPARATUS INSTALLED ON VEHICLE FOR PRODUCING CORRECT DETECTING RESULT

BACKGROUND OF THE INVENTION

1. Field of the Invention

The present invention relates to a radar apparatus installed on a vehicle, and more particularly to such a radar apparatus, which is used for a tracking operation or an alarm system for prevention of collision of vehicles.

2. Description of the Related Art

For the application in a tracking operation relative to a preceding vehicle and an alarm system for prevention of collision between vehicles, a radar apparatus installed on a vehicle has been developed. In the radar apparatus, a beam such as millimeter wave and laser wave is radiated to a reflector in such a way that a reflection wave is received back from the reflector to detect information on the reflector. For use in this radar apparatus installed on a vehicle, various radars have been developed such as an FM radar which transmits and receives a frequency modulation wave, an AM radar which transmits and receives an amplitude modulation wave, and a pulse radar.

In the radar apparatus installed on a vehicle, namely, in a vehicle radar apparatus for monitoring the front side of the vehicle, a beam having a sharp directivity is mechanically scanned to cover a predetermined angle range in the front of the vehicle. Otherwise, plural beams of the sharp directivity are transmitted in order from a plurality of antennas arranged to direct the beams at slightly different directions from each other. Thus, by performing electronic scanning of the beams, an azimuth data for the reflector and a distance to the reflector may be obtained. In Japanese Patent No. 2567332, which is granted to the assignee of the present invention, a time divisional radar system is disclosed, in which a beam is electronically scanned. Then, a weighting and averaging operation is performed in accordance with the reception level of the reflection wave. Thus, it is possible to detect the azimuth angle to the reflector.

In a general radar apparatus installed on vehicle, there is a case where the signal-to-noise (SN) ratio of the reflection wave is decreased so that the reception level of the reflection wave does not reach a predetermined threshold value. Also, when a plurality of reflectors such as road side structures or peripheral vehicles exist, there is a case where a frequency shift is brought about due to mutual influences. As a result, the detection of the reflection wave becomes difficult, so that various problems are caused such as degradation of the position precision of the reflector and no detection of the reflector.

SUMMARY OF THE INVENTION

The present invention is accomplished to solve the above problems. Therefore, an object of the present invention is to provide a radar apparatus installed on a vehicle which can simply detect movement of a reflector under a bad condition, without degradation of the detection precision of a distance and an azimuth angle to the reflector.

In order to achieve an aspect of the present invention, a radar apparatus installed on a vehicle includes a transmission section and a reception section. The transmission section has at least a transmission antenna, and emits a transmission wave toward a detection area in front of the vehicle. The transmission wave is reflected by a reflector to produce a reflection wave, and the detection area includes a plurality of sub-areas. The reception section has at least a reception antenna, and receives and detects the reflection wave. A detecting unit detects reflector indication data indicative of a reflector attribute for every sub-area for a current detection cycle based on the detecting result by the reception section. Also, the detecting unit determines whether the detected reflector indication data are correct, by use of the detected reflector indication data, to determine that the detected reflector indication data are final reflector indication data when it is determined that the detected reflector indication data are correct. A correcting unit corrects an incorrect one of the detected reflector indication data to a correct reflector indication data to produce the final reflector indication data, when it is determined that a part of the detected reflector indication data is not correct. A determining unit determines whether there is the reflector in the detection area, based on the final reflector indication data.

The radar apparatus may further include a monitoring unit for monitoring continuity of the final reflector indication data in the plurality of sub-areas to detect movement of the reflector in the detection area.

The detecting unit may determine whether the detected reflector indication data are correct by use of the detected reflector indication data for a detection cycle previous to the current detection cycle, in addition to the detected reflector indication data for the current detection cycle. The previous detection cycle need not be the cycle immediately prior to the current detection cycle, and could encompass one or more of the previous detection cycles.

In this case, the detecting unit may compare the detected reflector indication data for a detection cycle previous to the current detection cycle and the detected reflector indication data for the current detection cycle in units of sub-areas to determine whether the detected reflector indication data are correct. For this purpose, the detecting unit allocates one of the binary values, (0 or 1) to each of the plurality of sub-areas when a reception level of the detecting result by the reception section for the sub-area is equal to or higher than a predetermined threshold value and allocates the other of the binary values to the sub-area when the reception level of the detecting result by the reception section for the sub-area is lower than the predetermined threshold value. In this case, the detecting unit calculates an exclusive OR operation between the detected reflector indication data for a detection cycle previous to the current detection cycle and the detected reflector indication data for the current detection cycle, to determine whether the detected reflector indication data are correct.

The detecting unit may allocate one of the binary values to each of the plurality of sub-areas when a reception level of the detecting result by the reception section for the sub-area for the current detection cycle is equal to or higher than a predetermined threshold value and allocate the other of the binary values to the sub-area when the reception level of the detecting result by the reception section for the sub-area for the current detection cycle is lower than the predetermined threshold value. In this case, the detecting unit counts a number of times that inversion between the binary values has occured to determine whether the detected reflector indication data are correct.

Also, the detecting unit may determine whether the detected reflector indication data are correct based on the number that times of the inversion has occurred and the detected reflector indication data for the detection cycle previous to the current detection cycle.

In order to achieve another aspect of the present invention, a method of controlling a radar apparatus installed on a vehicle, includes the steps of:

emitting a transmission wave toward a detection area in a front of the vehicle, wherein the transmission wave is reflected by a reflector to produce reflection wave, and the detection area includes a plurality of sub-areas;

receiving and detecting the reflection wave;

detecting a reflector indication data indicative of a reflector attribute for every sub-area for a current detection cycle based on the detecting result of the receiving and detecting step;

determining whether the detected reflector indication data are correct, by use of the detected reflector indication data, to determine that the detected reflector indication data are final reflector indication data when it is determined that the detected reflector indication data are correct;

correcting an incorrect one of the detected reflector indication data to a correct reflector indication data to produce the final reflector indication data, when it is determined that a part of the detected reflector indication data is not correct; and determining whether there is the reflector in the detection area, based on the final reflector indication data.

DETAILED DESCRIPTION OF THE PRESENTLY PREFERRED EMBODIMENTS

Figure 1:
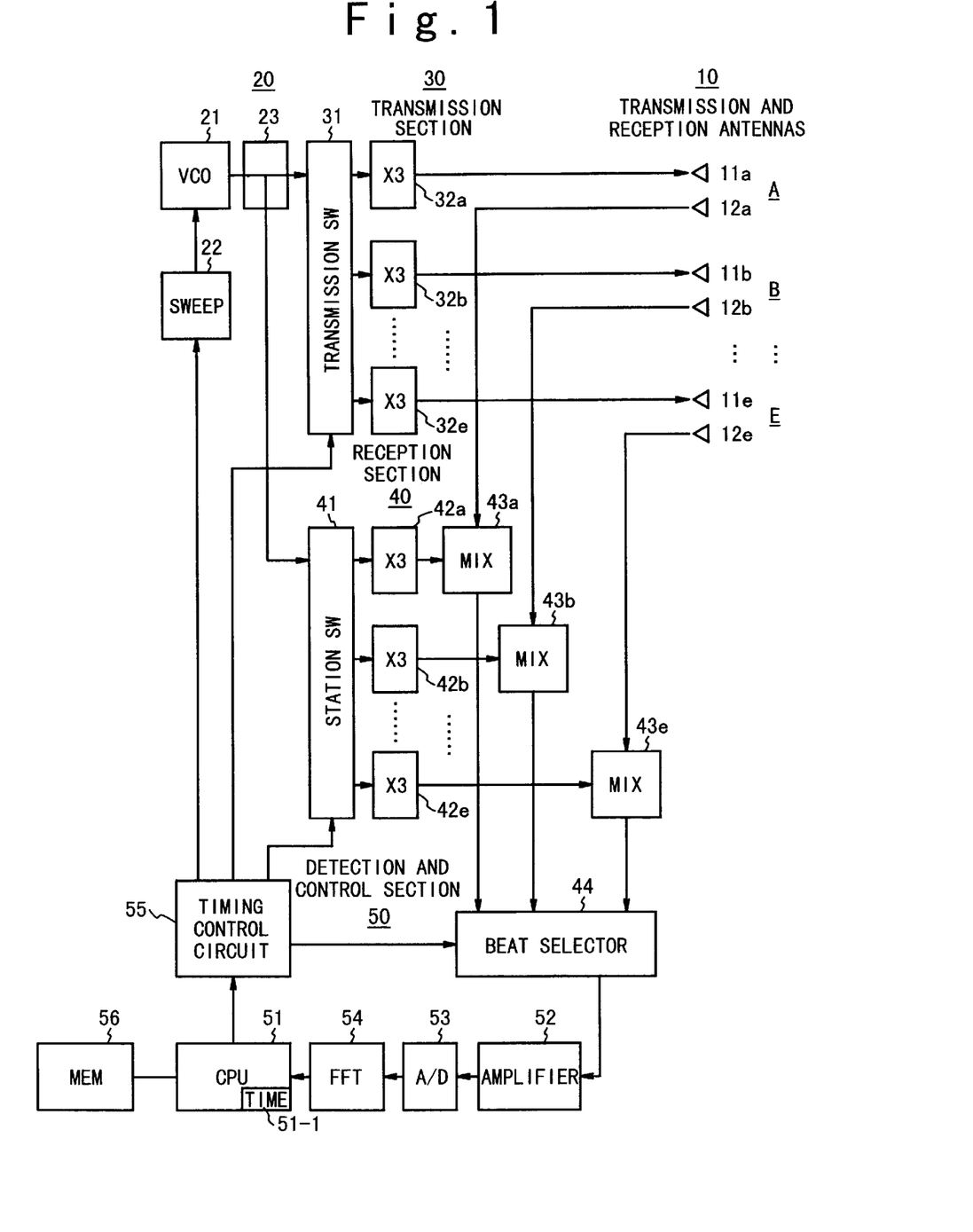
FIG. 1 is a block diagram illustrating the structure of a radar apparatus installed on a vehicle of a preferred embodiment of the present invention.

FIG. 1 is a block diagram illustrating the structure of a radar apparatus installed on a vehicle according to a preferred embodiment of the present invention. The radar apparatus is composed of a transmission and reception antenna section 10, an FM signal generating circuit 20, a transmission section 30, a reception section 40, and a detection and control section 50.

The transmission and reception antenna section 10 is composed of transmission antennas 11a to 11e and reception antennas 12a to 12e arranged in five sets of one transmission antenna and one reception antenna. The five sets of transmission and reception antennas correspond to transmission and reception channels A to E, respectively. The transmission antennas and the reception antennas are formed as a defocus parabolic multi-beam antenna composed of a common parabolic reflecting mirror and a plane array antenna as a primary emitter which is arranged to be opposite to the reflecting mirror in the neighborhood of the focus of this reflecting mirror. The respective transmission antennas 11a to 11e are installed to radiate beams in slightly different directions from each other in azimuth. The reflection waves, which are generated from the radiated beams, are received by the reception antennas 12a to 12e, respectively.

The FM signal generating section 20 is composed of a voltage controlled oscillator (VCO) 21, a sweep circuit 22, and a voltage dividing circuit 23. The sweep circuit 22 supplies a triangular modulation voltage to the voltage controlled oscillator 21 in response to a control signal from the detection and control section 50. The voltage controlled oscillator (VCO) 21 generates a high frequency signal in a submillimeter wave band based on the triangular modulation voltage supplied from the sweep circuit 22. The voltage dividing circuit 23 divides the high frequency signal into two components to supply to the transmission section 30 and the reception section 40.

The transmission section 30 is composed of a transmission switching circuit 31 and frequency triple increasing circuits 32a to 32e. The transmission switching circuit 31 sequentially supplies the divided component of the high frequency signal to the frequency triple increasing circuits 32a to 32e in response to a timing control signal supplied from the detection and control section 50. Each of the frequency triple increasing circuits 32a to 32e increases the frequency of the divided component of the high frequency signal to 3 times its original value such that a beam is radiated from the corresponding one of the transmission antennas 11a to 11e.

Each of the reception antennas 12a to 12e receives a reflection wave to generate a reflection FM signal. The reception section 40 is composed of a station switching circuit 41, frequency triple increasing circuits 42a to 42e and mixers 43a to 43e, and a beat selector 44. The station switching circuit 41 receives the divided component of the high frequency signal from the voltage dividing circuit 23 to sequentially supply same to the frequency triple increasing circuits 42a to 42e in response to a timing control signal supplied from the detection and control section 50. Each of the frequency triple increasing circuits 42a to 42e increases the frequency of the divided component of the high frequency signal to 3 times its original value and outputs same as a station FM signal to the corresponding one of the mixers 43a to 43e. Each of the mixers 43a to 43e receives the reflection FM signal and the station FM signal to output a beat signal between the reflection FM signal and the station FM signal to the beat selector 44. The beat selector 44 outputs one of the beat signals supplied from the mixers 43a to 43e in accordance with a timing control signal supplied from the detection and control section 50.

The detection and control unit 50 is composed of a CPU 51, an amplifying circuit 52, an analog to digital (A/D) converting circuit 53, a fast Fourier transform circuit (FFT) 54, a timing control circuit 55 and a memory (MEM) 56. The amplifying circuit 52 amplifies the selected beat signal outputted from the beat selector 44 to supply same to the A/D converting circuit 53. The A/D converting circuit 53 converts the amplified beat signal into a digital form. The FFT 54 performs fast Fourier transform to the digital beat signal to supply to the CPU 51. The CPU performs a detecting and managing process of a reflector indication data to frequency spectrum from the fast Fourier transform result based on a software program which is stored in the memory 56. The reflector indication data indicates a reflector attribute such as existence or non-existence of the reflector for each of the sub-areas of the detection area. The CPU 51 stores the reflection indication data in the memory 56. The memory 56 has memory areas (not shown) for storing reflection indication data for the sub-areas of the detection area for plural detection cycles.

More specifically, the FM signal generating section 20 generates an FM signal having a predetermined voltage level and the center frequency of approximately 20 GHz in the submillimeter wave band and changing linearly in a predetermined period therefrom. The FM signal is approximately equally divided by the voltage dividing circuit 23. One of the divided signal components is supplied to the transmission section 30 and the other is supplied to the reception section 40. In the transmission section 30, the FM signal supplied from the FM signal generating section 20 is distributed into the frequency triple increasing circuits 32a to 2e by the transmission switching circuit 31. Thus, the frequency of the FM signal is increased to 3 times its original value by the corresponding one of the frequency triple increasing circuits 32a to 32e, so that it is converted into the millimeter wave band FM signal in the 60 GHz band. The converted FM signals are supplied to the transmission antennas 11a to 11e in order to be radiated from the respective transmission antennas toward the space in front of the vehicle.

A part of the FM signals which have been radiated from the front of the vehicle through the transmission antennas 11a to 11e is reflected by a reflector such as a preceding vehicle, and then is received by the corresponding one of the reception antennas 12a to 12e. Thus, reflection FM signals are generated. The reflection FM signal is supplied to a corresponding one of the mixers 43a to 43e at one of the input terminals. The other input terminal of each of the mixers 43a to 43e is supplied with one of the station FM signals supplied from the FM signal generating section 20. The station FM signal is selected by the station switching circuit 41 at a predetermined timing. The frequency of the selected station FM signal is increased to 3 times its original value by a corresponding one of the frequency triple increasing circuits 42a to 42e, to generate a millimeter wave band station FM signal.

Beat signals of the reflection FM signal and the station FM signal are outputted from the mixers 43a to 43e. The beat signals are selected in order by the beat selector 44 for the respective transmission and reception channel and are supplied to the amplifying circuit 52 of the detection and control unit 50. The beat signal is amplified by the amplifying circuit 52 and converted into a digital signal by the analog to digital converting circuit 53, and then is supplied to the fast Fourier transform circuit 54. The beat signal is converted into a frequency spectrum of the beat signal and is supplied to the CPU 51. The CPU 51 detects from the frequency spectrum, reflector indication data indicating a reflector attribute such as the center position and width of the reflector and the azimuth angle to the reflector. Also, the CPU 51 detects the distance to the reflector based on the beat signal indicative of the difference between the timing when the beam is radiated and the timing when the reflection wave is received. Further, the CPU 51 controls the timing control circuit 55 to generate various timing control signals, based on which the operations of respective sections in this FM radar apparatus are controlled.

Figure 2:
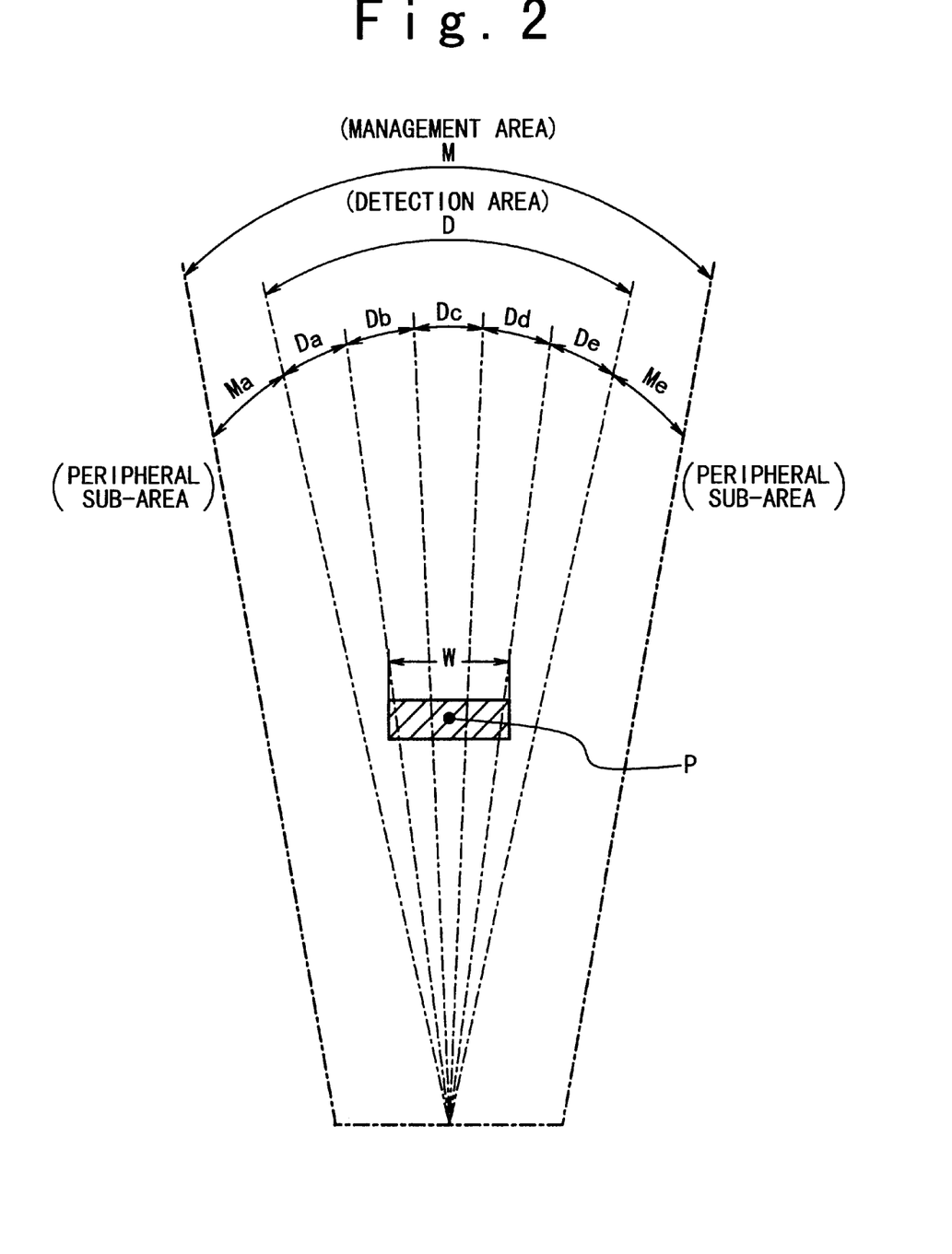
FIG. 2 is a conceptual diagram to explain the relation between a detection area and a management area in the radar apparatus installed on a vehicle according to the preferred embodiment of the present invention.

FIG. 2 is a conceptual diagram to explain the structure of a management area M. The management area M is composed of a detection area D and peripheral areas Ma and Me. The detection area is formed as the area of a fan shape which spreads radially in the front of the vehicle on which this radar apparatus is installed. The detection area D of this fan type is composed of five sub-areas Da, Db, Dc, Dd and De of a thin fan shape which have substantially the identical shape to each other. The five sub-areas Da, Db, Dc, Dd and De correspond to the transmission and reception channels A to E, respectively. The FM signal beams are radiated to the five sub-areas Da to De from the respective transmission antennas 11a to 11e shown in FIG. 1, respectively. The FM signal beam has a width approximately equal to or slightly wider than that of the corresponding sub-area. Also, the reflection wave is generated in the corresponding sub-area and is received by the corresponding one of the reception antennas 12a to 12e.

The peripheral areas Ma and Me are formed on both sides of the detection area D and have substantially the same width as that of the preceding vehicle.

The management area M is an area used to manage the movement of the reflector such as the preceding vehicle which has been detected in the detection area D.

Figure 3:
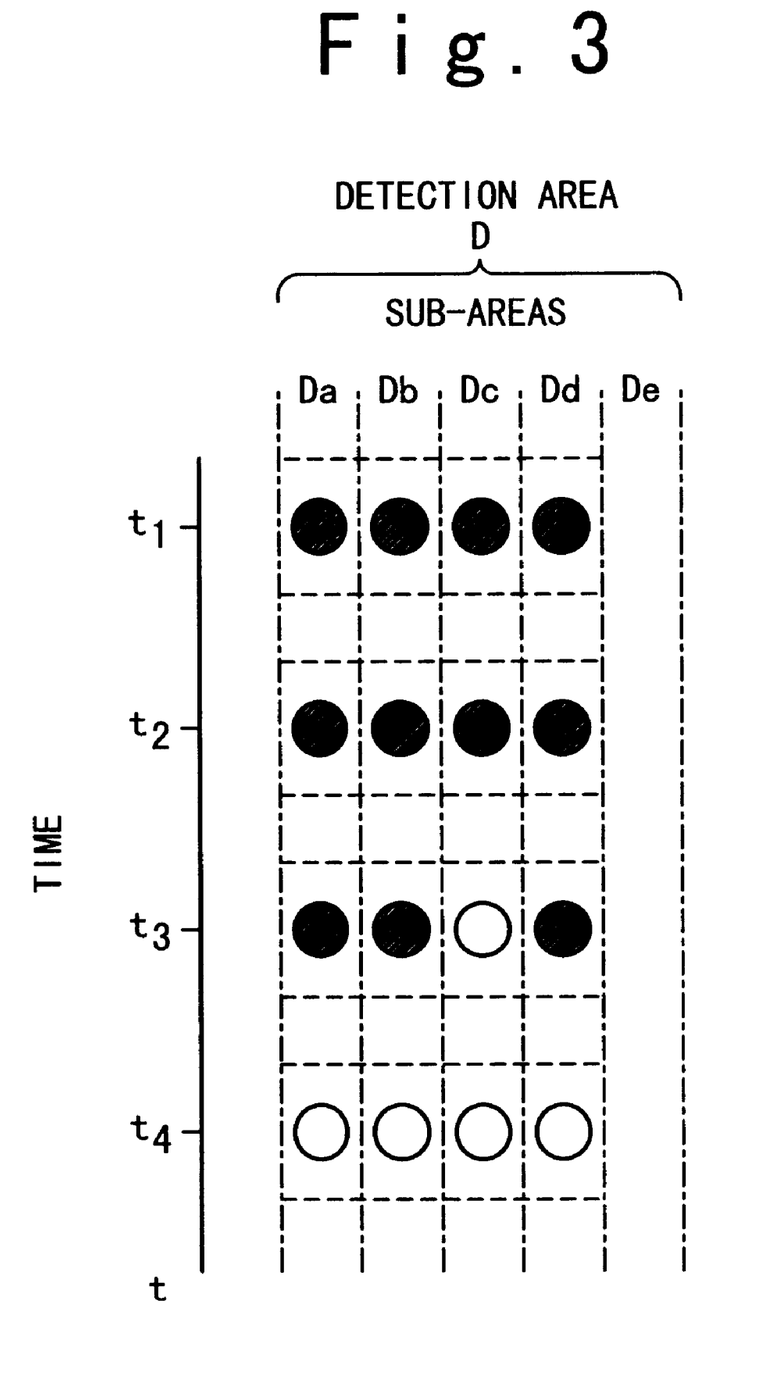
FIG. 3 is a conceptual diagram to explain a detection example of existence or non-existence of a reflection wave in the detection area in the radar apparatus installed on a vehicle according to the preferred embodiment of the present invention.

FIG. 3 is a conceptual diagram indicative of an example of the existence or non-existence of the reflection FM signals which have the approximately identical beat frequency and which are detected at different times in each sub-area. In the figure, a time axis is set toward the bottom and left side of the figure. A mark ● is a reflector indication data. The mark ● indicates that the reflection FM signal of the approximately identical beat frequency is detected in each sub-area at each of times t1, t2, t3. . . . The detected reflection FM signal has the reception level of the reflection FM signal higher than a predetermined threshold value. In case of an FM radar apparatus installed on a vehicle in this embodiment, the beat frequencies between the reflection FM signals received from the respective sub-areas are approximately same. This means that the reflection FM signal is generated from the reflector which exists in the approximately identical distance from the vehicle on which the radar apparatus is installed. That is, the reflection FM signal is generated from a single reflector such as the preceding vehicle which exists over the sub-areas.

Also, a mark ○ is not the reflector indication data. That is, the mark ○ indicates that the reflection FM signal cannot be detected in each sub-area in each time and the reflector indication data is produced by the CPU 51 by correction or interpolation of the reflector indication data. The correction of this reflector indication data is performed when it is regarded that the reflection FM signal having substantially the same frequency should be detected. The correction is performed by use of the reflector indication data for the sub-areas for a detection cycle immediately previous to or more previous than a current detection cycle. This correction is performed such that the temporal and spatial continuity of the reflector indication data can be reserved.

More specifically, the reflector indication data for every sub-area for each of a plurality of detection cycles is stored in the memory 56. In this example, the reflector indication data for every sub-area for two detection cycles are stored in the memory 56. However, the reflector indication data for every sub-area for more than two detection cycles may be stored in the memory 56.

In this case, at each of the adjacent times t1 and t2, the reflection FM signals of substantially the same frequency are detected in a series of four adjacent sub-areas Da to Dd, as shown by the mark ●.

At the following time t3, the reflection FM signal of substantially the same frequency is not detected in the sub-area Dc. However, the reflection FM signal of substantially the same frequency has been detected in the series of four adjacent sub-areas Da to Dd for the previous detection time t2 to the current detection cycle at time t3. Also, the reflection FM signal of substantially the same frequency is detected in each of the three adjacent sub-areas Da, Db and Dd other than the sub-area Dc. Therefore, it is regarded that the reflection FM signal of substantially the same frequency as those of the reflection FM signals which have been detected in the adjacent sub-areas is generated in this sub-area Dc but is extinguished or failed to be detected due to some reason(s). As a result, a correct reflector indication data for the sub-area Dc is generated based on a set of reflector indication data for a detection cycle immediately previous to or more previous than the current detection cycle, and stored in the memory area corresponding to the sub-area Dc for the current detection cycle. Thus, a set of reflector indication data for the current detection cycle is corrected through the generation or interpolation of the correct reflector indication data.

At the following time t4, no reflection FM signal of substantially the same frequency is detected in any of the four adjacent sub-areas Da to Dd. However, the detection result at the immediately previous time t3 is considered, and the detection results of the reflection FM signals of substantially the same frequency are approximately set in all of the four adjacent sub-areas Da to Dd, as shown by the mark ○. In this case, the frequency of the beat signal and the distance to the reflector are actually not detected for this detection cycle. However, the reflector indication data are set based on previously detected reflector indication data. Also, a relative velocity and distance between the subject vehicle on which the apparatus is installed and the reflector is generated based on the frequency of the beat signal for the previous detection cycle and time variation of the beat signal frequency.

Figure 4:
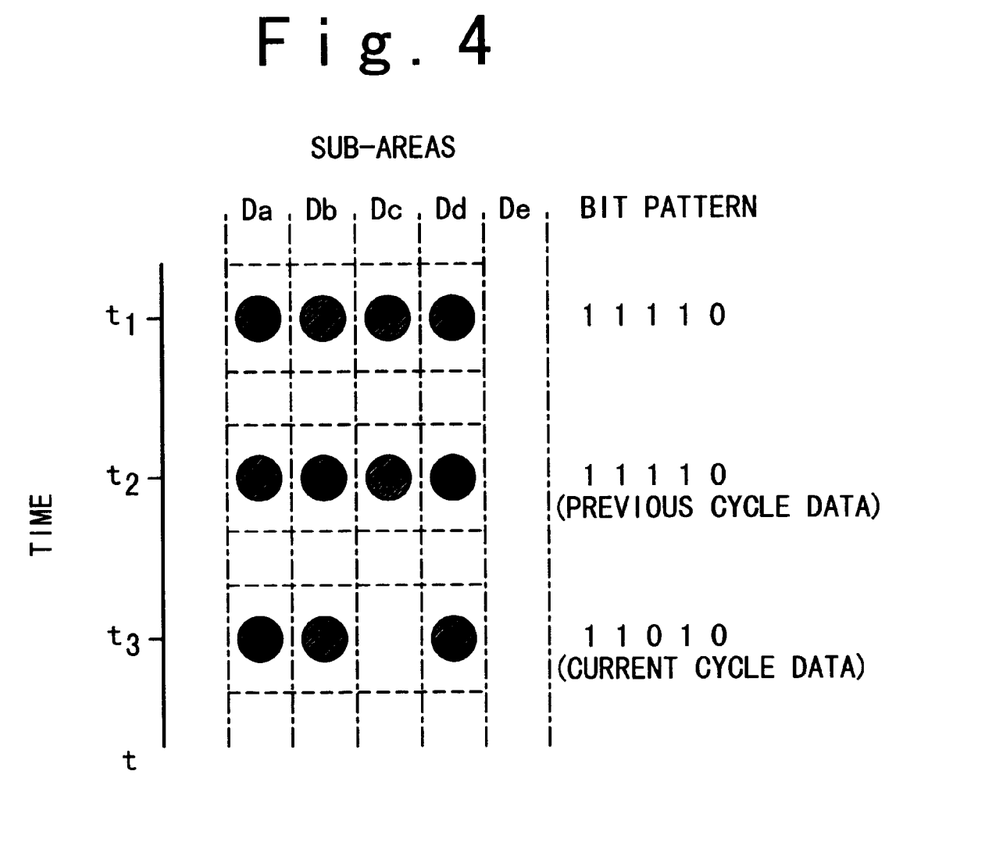
FIG. 4 is a conceptual diagram to explain another detection example of existence or non-existence of a reflection wave in the detection area in the radar apparatus installed on a vehicle according to the preferred embodiment of the present invention.

FIG. 4 is a conceptual diagram to explain a method of detecting the extinguishment of the reflection wave in each sub-area. According to this detecting method, existence and non-existence of the reflection wave in each sub-area is expressed in "1" and "0" of the binary data, respectively. Also, a bit pattern of "1s" and "0s" arranged along an arrangement direction of the sub-areas in the previous detection cycle and that in the current detection cycle are compared so that it is detected that the reflection waves are extinguished in some sub-areas. Such a bit pattern is "11110" at either of the times t1 and t2 and is "11010" at the time t3.

When the CPU 51 performs an exclusive OR operation between the bit patterns at the times t1 and t2, "00000" is obtained. Thus, the extinguishment of the reflection wave is not detected. On the other hand, the exclusive OR of the bit patterns at the times t2 and t3 is "00100". Thus, the extinguishment of the reflection wave in the sub-area Dc is detected based on the appearance of the bit of "1".

Figure 5:
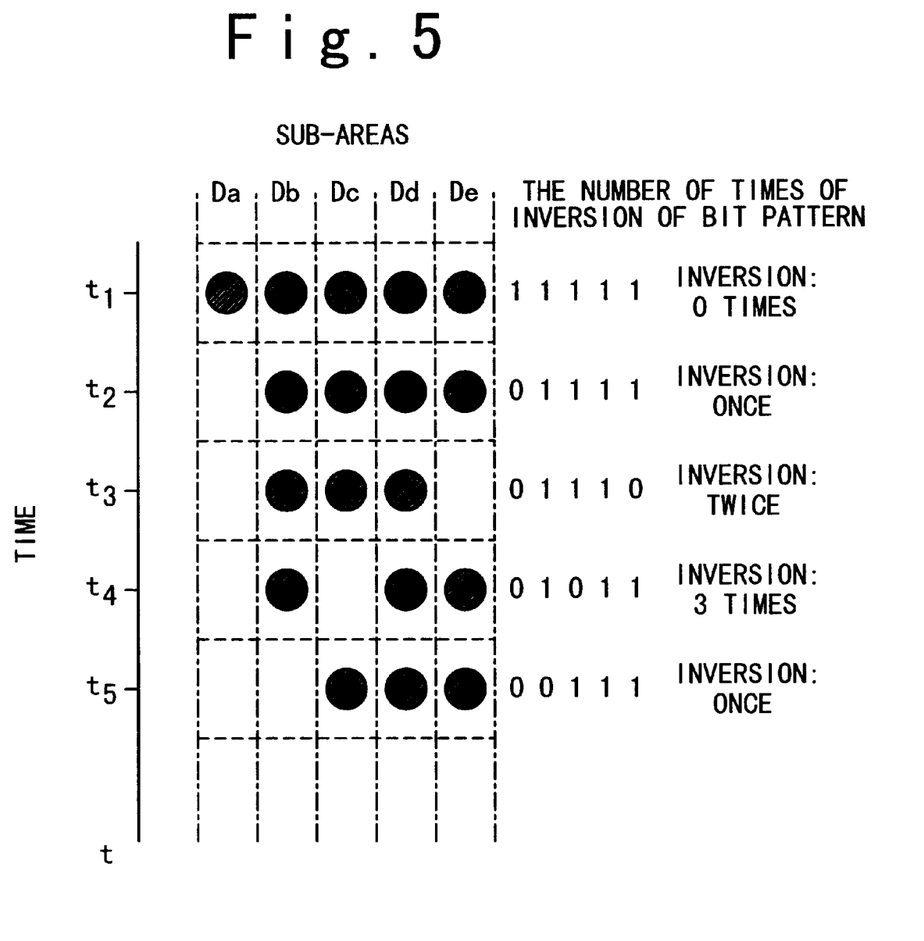
FIG. 5 is a conceptual diagram to explain still another detection example of existence or non-existence of a reflector in the detection area in the radar apparatus installed on a vehicle according to the preferred embodiment of the present invention.

FIG. 5 a conceptual diagram to explain another method of detecting the extinguishment of the reflection wave in each sub-area and the continuation situation of a series of reflection FM signals. According to this detecting method, the existence or non-existence of the reflection wave in each sub-area is expressed by "1" and "0" of the binary data, respectively. In the bit pattern are arranged "1s" and "0s" along the arrangement direction of the sub-areas Da to De. When a scanning is performed in this bit pattern relative to this arrangement direction, the number of times of inversion between the adjacent bits of "1" and "0" is counted by the CPU 51. Thus, the continuation situation of the reflection FM signals is detected in the series of adjacent sub-areas. Also, the number of times of inversion in the current detection cycle and the number of times of inversion in the previous detection cycle are compared with each other so that the extinguishment of the reflection wave is detected in the sub-area.

In the example shown in FIG. 5, the number of times of the inversion at the time t1 is 0 times. This indicates that the reflector is detected over all the relative sub-areas. The number of times of the inversion at the time t2 is once. This indicates that there are the sub-areas in which the reflection FM signal has been detected and the sub-area in which the reflection FM signal has not been detected. Also, this indicates that the reflection FM signal is not detected in one of the left end sub-area and the right end sub-area.

The number of times of the inversion at the time t3 is twice. In this case, because the left end bit is "0", the reflector is detected at the center of the detection area. The number of times of the inversion at the time t4 is three times. This indicates that the reflector has not been detected in the continuous adjacent sub-areas. In this case, the extinguishment of the reflection wave in the sub-areas is considered. Also, by comparing the bit pattern in the previous detection cycle and the bit pattern in the current detection cycle, the extinguishment of the reflection wave is detected. In this case, a binary data of "1" is overwritten in the memory 56 for the sub-area Dc such that the reflection indication data for the sub-areas corresponding to the reflector are corrected and completed.

Also, considering the case where the state is changed from the state at the time t2 to the state at the time t5 with the elapse of time, the number of times of the inversion is once in both states but the number of sub-areas in which the reflection waves are detected decreases from four to three. Therefore, it could be considered that the reflector is moving out of the detection area.

In this way, the CPU 51 stores in the memory 56, the bit pattern in the previous detection cycle and the number of continuous sub-areas in which the reflection FM signals are detected. Thus, the number of times of the inversion between the detection and the non-detection and the number of continuous sub-areas in which the reflection waves are detected are monitored so that the movement of the reflector in the detection area can be detected.

In the above description, there is a potential problem in the point of whether a reflection wave stronger than the predetermined threshold value is detected in each sub-area of the detection area D. However, when the center position of the reflector to the lateral direction is determined, a weighting and averaging operation in the azimuth may be used based on the reception level of the reflection wave. That is, the weighting and averaging operation in the azimuth angle of the centerline of each fan-shaped sub-area can be used.

Particularly, it is supposed that the azimuth angles of the centerlines of respective fan-shaped sub-areas are θa, θb, θc, θd, and θe, and the reception levels of the reflection waves which are received in the respective sub-areas are La, Lb, Lc, Ld, and Le. In this case, the center position Θ of the reflector to the lateral direction is calculated as the result of the following weighting and averaging operation.

$$\Theta = (La\theta a + Lb\theta b + Lc\theta c + Ld\theta d + Le\theta e)/(La + Lb + Lc + Ld + Le) \quad (1)$$

Also, the example is described above in which the transmission antennas and the reception antennas are formed as a defocus parabolic multi-beam antenna which is composed of a common parabolic reflecting mirror and a primary emitter such as a plane array antenna arranged to be opposite to the reflecting mirror in the neighborhood of the focus of this reflecting mirror. However, the radar apparatus may be formed to have a structure in which a beam is radiated over all the detection areas from a single transmission antenna to have substantially uniform level, and the reflection waves which are generated in the respective sub-areas may be received by a plurality of reception antennas having a narrow directivity to cover the corresponding sub-areas. On the contrary, the radar apparatus may be formed to have a structure in which a beam is radiated by the transmission antenna having the narrow directivity to each sub-area, and the reflection waves which are generated in the respective sub-areas are received by a single transmission antenna having a wide directivity.

Moreover, the example of the FM radar which radiates a frequency modulated wave is described. However, other various systems can be applied such as an AM radar which radiates an amplitude modulated wave and receives the reflection wave, a pulse radar which radiates a pulse electromagnetic wave and receives the reflection wave, and which detects a distance to the reflector based on the time difference from the radiation to the reception, instead of such a frequency modulated wave.

Moreover, the example is described in which a millimeter wave band electromagnetic wave is radiated and the reflection wave is received. However, it is possible to make the radar apparatus to have a structure in which the electromagnetic wave having another frequency such as a microwave band or a laser beam, and another suitable wave such as supersonic wave and so on is radiated and the reflection wave is received so that the distance to the reflector and an azimuth angle are detected.

The radar apparatus installed on a vehicle of the present invention determines that a single reflector exists over a series of sub-areas when it is regarded that the distances obtained from the detected reflection waves are substantially the same over the series of sub-areas and the reception levels are higher than a predetermined value over the series of sub-areas, and detects and monitors the detection situation of the reflector in each of the sub-areas. Also, the radar apparatus performs interpolation based on other detection results when the reflection wave is extinguished in any of the sub-areas. Therefore, it is possible to prevent the degradation of detection position accuracy even under the situation such as low reception level.

Also, according to the present invention, it is possible to easily perform the detection of the detection situation of the reflector. Therefore, it is possible to simplify the determination of whether the interpolation is to be performed and the monitoring of the reflector in the detection area.

Although there have been described what are considered at present to be the preferred embodiments of the invention, it will be understood by persons skilled in the art that variations and modifications may be made thereto without departing from the spirit or essence of the invention. The scope of the invention is indicated by the appended claims, rather than by the foregoing description.

What is claimed is:

1. A radar apparatus installed on a vehicle comprising:
   a transmission section having at least a transmission antenna, for emitting a transmission wave toward a detection area in front of said vehicle so as to be reflected by a reflector to produce a reflection wave, and said detection area includes a plurality of sub-areas;
   a reception section having at least a reception antenna, for receiving and detecting said reflection wave;
   detecting means for detecting reflector indication data indicative of a reflector attribute for every said sub-area for a current detection cycle based on a detecting result by said reception section, for determining whether said detected reflector indication data are correct, by use of said detected reflector indication data, and for determining that said detected reflector indication data are final reflector indication data when said detected reflector indication data are determined to be correct;
   correcting means for correcting an incorrect part of said detected reflector indication data to a correct reflector indication data to produce said final reflector indication data, when said determining means determines that said part of said detected reflector indication data is not correct; and
   determining means for determining whether there is said reflector in said detection area, based on said final reflector indication data.

2. A radar apparatus according to claim 1, further comprising monitoring means for monitoring continuity of said final reflector indication data in said plurality of sub-areas to detect movement of said reflector in said detection area.

3. A radar apparatus according to claim 1, wherein said detecting means determines whether said detected reflector indication data are correct by use of said detected reflector indication data for a detection cycle previous to said current detection cycle, in addition to said detected reflector indication data for said current detection cycle.

4. A radar apparatus according to claim 3, wherein said detecting means compares said detected reflector indication data for said previous detection cycle and said detected reflector indication data for said current detection cycle in units of sub-areas to determine whether said detected reflector indication data are correct.

5. A radar apparatus according to claim 4, wherein said detecting means allocates one of the binary values to each of said plurality of sub-areas when a reception level of the detecting result by said reception section for said sub-area is equal to or higher than a predetermined threshold value, and allocates the other of the binary values to said sub-area when the reception level of the detecting result by said reception section for said sub-area is lower than the predetermined threshold value.

6. A radar apparatus according to claim 5, wherein said detecting means calculates an exclusive OR operation between said detected reflector indication data for said previous detection cycle and said detected reflector indication data for said current detection cycle, to determine whether said detected reflector indication data are correct.

7. A radar apparatus according to claim 3, wherein said detecting means allocates one of the binary values to each of said plurality of sub-areas when a reception level of the detecting result by said reception section for said sub-area for said current detection cycle is equal to or higher than a predetermined threshold value, and allocates the other of the binary values to said sub-area when the reception level of the detecting result by said reception section for said sub-area for said current detection cycle is lower than the predetermined threshold value, counts a number of times of inversion between the binary values, and determines whether said detected reflector indication data are correct based on the number of times of the inversion and said detected reflector indication data for the previous detection cycle.

8. A radar apparatus according to claim 3, wherein said previous detection cycle includes at least one of a detection cycle immediately prior to said current detection cycle and a prior detection cycle more than once removed from the current detection cycle.

9. A radar apparatus according to claim 1, wherein said detecting means allocates one of the binary values to each of said plurality of sub-areas when a reception level of the detecting result by said reception section for said sub-area for said current detection cycle is equal to or higher than a predetermined threshold value, and allocates the other of the binary values to said sub-area when the reception level of the detecting result by said reception section for said sub-area for said current detection cycle is lower than the predetermined threshold value, and counts a number of times of inversion between the binary values to determine whether said detected reflector indication data are correct.

10. A method of controlling a radar apparatus installed on a vehicle, comprising the steps of:

emitting a transmission wave toward a detection area in front of said vehicle so as to be reflected by a reflector to produce a reflection wave, and said detection area includes a plurality of sub-areas;

receiving and detecting said reflection wave;

detecting reflector indication data indicative of a reflector attribute for every said sub-area for a current detection cycle based on the detecting result of said receiving and detecting step;

determining whether said detected reflector indication data are correct, by use of said detected reflector indication data, to determine that said detected reflector indication data are final reflector indication data when said detected reflector indication data are determined to be correct;

correcting an incorrect part of said detected reflector indication data to correct reflection indication data to produce said final reflector indication data, when said determining means determines that said part of said detected reflector indication data is not correct; and determining whether there is said reflector in said detection area, based on said final reflector indication data.

11. A method according to claim 10, further comprising the step of monitoring continuity of said final reflector indication data in said plurality of sub-areas to detect movement of said reflector is said detection area.

12. A method according to claim 10, wherein said detecting step includes:

determining whether said detected reflector indication data are correct, by use of said detected reflector indication data for a detection cycle precious to said current detection cycle, in addition to said detected reflector indication data for said current detection cycle.

13. A method according to claim 12, wherein said detecting step includes:

comparing said detected reflector indication data for said previous detection cycle and said detected reflector indication data for said current detection cycle in units of sub-areas to determine whether said detected reflector indication data are correct.

14. A method according to claim 13, wherein said detecting step includes:

allocating one of the binary values to each of said plurality of sub-areas when a reception level of the detecting result in said receiving and detecting step for said sub-area is equal to or higher than a predetermined threshold value, and allocating the other of the binary values to said sub-area when the reception level of the detecting result in said receiving and detecting step for said sub-area is lower than the predetermined threshold value.

15. A method according to claim 14, wherein said detecting step includes:

calculating an exclusive OR operation between said detected reflector indication data for said previous detection cycle and said detected reflector indication data for said current detection cycle, to determine whether said detected reflector indication data are correct.

16. A method according to claim 12, wherein said detecting step includes:

allocating one of the binary values to each of said plurality of sub-areas when a reception level of the detecting result in said receiving and detecting step for said sub-area for said current detection cycle is equal to or higher than a predetermined threshold value, and allocating the other of the binary values to said sub-area when the reception level of the detecting result in said receiving and detecting step for said sub-area for said current detection cycle is lower than the predetermined threshold value;

counting a number of times of inversion between the binary values; and determining whether said detected reflector indication data are correct, based on the number of times of the inversion and said detected reflector indication data for the previous detection cycle.

17. A method according to claim 12, wherein said previous detection cycle includes at least one of a detection cycle immediately prior to said current detection cycle and a prior detection cycle more than once removed from the current detection cycle.

18. A method according to claim 10, wherein said detecting step includes:

allocating one of the binary values to each of said plurality of sub-areas when a reception level of the detecting result in said receiving and detecting step for said sub-area for said current detection cycle is equal to or higher than a predetermined threshold value, and allocating the other of the binary values to said sub-area when the reception level of the detecting result in said receiving and detecting step for said sub-area for said current detection cycle is lower than the predetermined threshold value; and counting a number of times of inversion between the binary values to determine whether said detected reflector indication data are correct.

* * * * *

UNITED STATES PATENT AND TRADEMARK OFFICE
CERTIFICATE OF CORRECTION

PATENT NO. : 6,075,479
DATED : June 13, 2000
INVENTOR(S) : Hiroshi Kudoh

It is certified that error appears in the above-identified patent and that said Letters Patent is hereby corrected as shown below:

Title page,
Under "[56] References Cited", further under "U.S. PATENT DOCUMENTS", insert the following references:

-- 3,940,762    2/1976    Ethington et al.
    4,122,450    10/1978    Kowalski et al.
    4,357,607    11/1982    Van der Heijden et al.
    5,668,739    9/1997    League et al. --;

further under "FOREIGN PATENT DOCUMENTS" insert the following reference: -- 0495759  1/1992  E.P.O. --.

Column 2,
Line 35, after "values" delete the comma;
Line 62, after "and" insert -- on --.

Column 4,
Line 63, after "supply" insert -- same --.

Column 9,
Line 30, after "on" insert a comma.

UNITED STATES PATENT AND TRADEMARK OFFICE
CERTIFICATE OF CORRECTION

PATENT NO. : 6,075,479
DATED : June 13, 2000
INVENTOR(S) : Hiroshi Kudoh

It is certified that error appears in the above-identified patent and that said Letters Patent is hereby corrected as shown below:

Column 11,
Line 41, change "is" to -- in --;
Line numbered between 46 and 47 change "precious" to -- previous --.

Signed and Sealed this

Seventh Day of August, 2001

*Attest:*

*Nicholas P. Godici*

*Attesting Officer*

NICHOLAS P. GODICI
*Acting Director of the United States Patent and Trademark Office*